United States Patent
Togawa et al.

(10) Patent No.: US 6,763,096 B2
(45) Date of Patent: Jul. 13, 2004

(54) INFORMATION COMMUNICATION TERMINAL WITH MAIL RECEIVING FUNCTION

(75) Inventors: Masamichi Togawa, Musashimurayama (JP); Yoichi Nagashima, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/101,745

(22) Filed: Mar. 21, 2002

(65) Prior Publication Data

US 2002/0136373 A1 Sep. 26, 2002

(30) Foreign Application Priority Data

Mar. 23, 2001 (JP) ........................................ 2001-084994

(51) Int. Cl.⁷ ............................................ H04M 11/00
(52) U.S. Cl. .................................................... 379/93.24
(58) Field of Search ........................... 379/93.24, 93.23, 379/93.25, 93.17; 709/206, 207

(56) References Cited

U.S. PATENT DOCUMENTS

| 4,924,495 A | 5/1990 | Richards et al. |
| 6,564,264 B1 * | 5/2003 | Creswell et al. ............ 709/206 |
| 2003/0078981 A1 * | 4/2003 | Harms et al. ................ 709/206 |

FOREIGN PATENT DOCUMENTS

| EP | 0 964 594 A | 12/1999 | |
| JP | 11161573 A * | 6/1999 | .......... H04M/11/00 |
| JP | 2001-111672 | 4/2001 | |
| WO | WO 99 29127 A | 6/1999 | |

* cited by examiner

Primary Examiner—Stella Woo
(74) Attorney, Agent, or Firm—Finnegan, Henderson, Farabow, Garrett & Dunner, L.L.P.

(57) ABSTRACT

An information communication terminal with an e-mail receiving section extracts a plurality of informations corresponding to sender of the e-mail from the received e-mail. Then, the information communication terminal registers the extracted informations in its phone book in one registering operation by a user of the terminal.

2 Claims, 5 Drawing Sheets

INFORMATION COMMUNICATION TERMINAL WITH MAIL RECEIVING FUNCTION

CROSS-REFERENCE TO RELATED APPLICATIONS

This application is based upon and claims the benefit of priority from the prior Japanese Patent Application No. 2001-084994, filed Mar. 23, 2001, the entire contents of which are incorporated herein by reference.

BACKGROUND OF THE INVENTION

1. Field of the Invention

This invention relates to a communication terminal such as a personal computer, PDA (Personal Digital Assistant), or mobile phone, and more particularly to an information communication terminal with the function of receiving electronic mail.

2. Description of the Related Art

In recent years, more and more terminal devices with an electronic mail transmitting/receiving function have been developed way into not only the field of wireline information communication terminals, such as personal computers, but also the field of mobile communication terminals, such as mobile phone terminals and PDAs. This type of terminal is usually provided with a phone book. In the phone book, identification information of the terminals with other parties is registered. Use of the phone book enables electronic mail to be transmitted or received efficiently.

Generally, the registering of the identification information in the phone book is effected by starting a phone book registering program and inputting identification information through the user's key input operation. The identification information including the name, mail address, and telephone number of the other party. Thus, it takes a lot of time and effort to enter all of such pieces of information through key input operations. Since a small-sized communication terminal device such as a mobile phone terminal has a small key input section, the user has difficulty in operating it and therefore is liable to enter the wrong data.

To overcome such problems, an attempt has been recently made to enable a mobile communication terminal to register information in the phone book by making use of the sender identification information included in a received mail. With this type of registering method, however, a plurality of information elements, including the source address and the telephone number of the sending user (callback telephone number), contained in the received mail are displayed separately. Then, each of the displayed information elements is subjected to a specific save operation, thereby registering the currently displayed information element in the phone book. Therefore, registering all of the information elements requires the display screens to be changed each time a different information element is subjected to a specific save operation. As a result, the save operations have been a troublesome job in this registering method.

BRIEF SUMMARY OF THE INVENTION

It is accordingly an object of the present invention to provide a communication terminal apparatus which enables identification information about the other party to be registered in its phone book easily in a shorter time.

According to an aspect of the present invention, there is provided an information communication terminal comprising: a phone book; a mail receiving section configured to receive electronic mail which includes a plurality of informations corresponding to sender of the electronic mail; an extracting section configured to extract the plurality of informations from the electronic mail received by the mail receiving section; and a registration controller configured to register the plurality of informations extracted by the extracting section in the phone book simultaneously in one operation by the user.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

Hereinafter, referring to the accompanying drawings, an embodiment of the present invention will be explained. In this embodiment, electronic mail delivery service will be explained using an example of the transmission of electronic mail between mobile phone terminals according to a protocol unique to a carrier, or Short Message Service (SMS)

Figure 1:
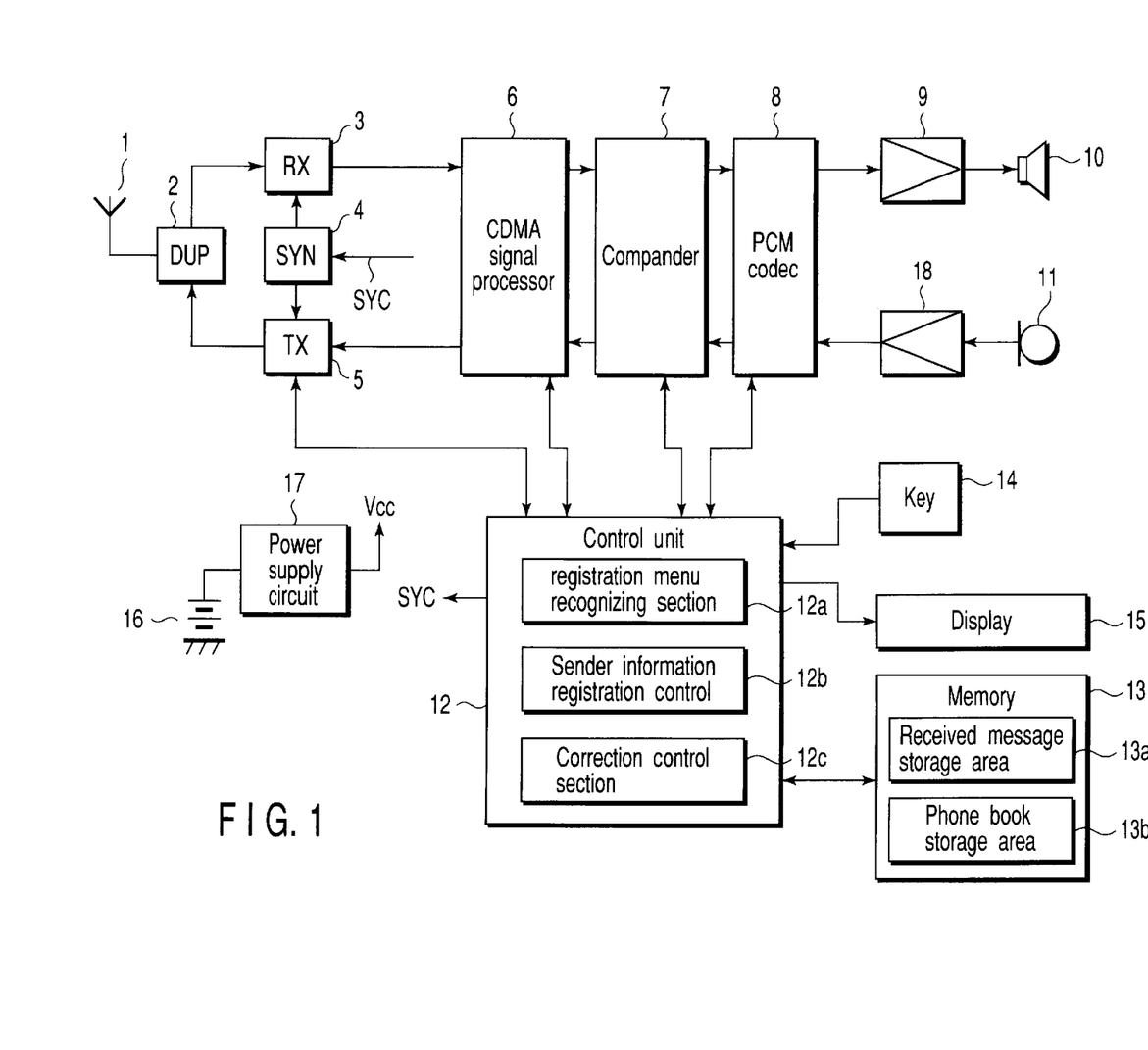
FIG. 1 is a block diagram showing a functional configuration of a mobile phone terminal, an embodiment of a mobile communication terminal unit according to the present invention.

FIG. 1 is a block diagram showing the configuration of a mobile phone terminal which is an embodiment of an information communication terminal according to the present invention.

A radio signal transmitted from a base station (not shown) is received by an antenna 1. The radio signal is then input to a receiving circuit (RX) 3 via a duplexer 2 (DUP). The receiving circuit 3 mixes the received radio signal with a local oscillation signal output from a frequency synthesizer (SYN) 4, thereby frequency-converting the radio signal into an intermediate frequency signal. Then, the intermediate frequency signal is demodulated orthogonally, thereby producing a reception baseband signal. The frequency of the local oscillation signal generated from the frequency synthesizer 4 is specified by a control signal SYC from a CPU 12.

The reception baseband signal is input to a CDMA signal processing section 6. The CDMA signal processing section 6 includes a RAKE receiver. The RAKE receiver subjects a plurality of paths included in the reception baseband signal to a despread process using the respective spreading codes. The signals in the individual paths subjected to the despread process are brought in phase with one another and thereafter combined. As a result, reception packet data in a specific transmission format is obtained. Then, the reception packet data is input to a compressor/expander (hereinafter, referred to as a compander) 7.

The compander 7 causes a multiplexer/demultiplexer to separate the reception packet data output from the CDMA signal processing section 6 on a media data item basis. Then, a decoding process is carried out for each of the separated media data items. For example, if audio data is included in the reception packet data, the audio data is decoded by a speech codec in compander. If video data is included in the reception packet data, the video data is decoded by a video codec in compander. The digital audio signal obtained from the decoding process is input to a PCM codec 8. The digital video signal is input to the CPU 12. If text data, such as mail (including short messages) is included in the reception packet data, the text data is input to the CPU 12.

The PCM codec 8 PCM-decodes the digital audio signal output from the compander 7, thereby producing an analog audio signal. The analog audio signal is amplified at a receive amplifier 9. The amplified signal is output by a speaker 10.

The CPU 12 cause the digital video signal output from the compander 7 to appear on an LCD display 15 with the help of a video memory. The CPU 12 not only stores text data, such as mail, in a memory 13 but also causes the text data to appear on the LCD display 15.

When an external information terminal, such as a PDA or a notebook personal computer, is connected to the mobile phone terminal, the CPU 12 transfers the data before being decoded at the compander 7 to the external information terminal via an external interface (not shown).

On the other hand, the speech signal of a user input to a microphone 11 is amplified by a transmit amplifier 18 to a suitable level. The amplified signal is then subjected to a PCM coding process at a PCM codec 8, thereby producing a digital audio signal, which is input to the compander 7. The video signal produced by a camera (not shown) is digitized by the CPU 12. The digitized signal is then input to the compander 7. The CPU 12 inputs text data, such as mail, created therein to the compander 7.

The compander 7 senses the amount of energy of the input speech from the digital audio signal output from the PCM codec 8. On the basis of the result of the sensing, the compander 7 determines a transmission data rate. Then, the compander 7 encodes the digital audio signal into a signal in the format corresponding to the transmission data rate, thereby producing audio data. Furthermore, the compander 7 encodes the digital video signal output from the CPU 12, thereby creating video data. Then, the multiplexer/demultiplexer in the compander 7 packets the audio data and video data according to a specific transmission format. The transmission packet data is then output to the CDMA signal processing section 6. When the CPU 12 outputs text data, such as mail (including short messages), the compander 7 also multiplexes the text data with the transmission packet data.

The CDMA signal processing section 6 subjects the transmission packet data output from the compander 7 to a spectrum spreading process, using the spreading code allocated to the transmission channel. Then, the CDMA signal processing section 6 supplies its output signal to a transmitting circuit (TX) 5. The transmitting circuit 5 modulates the spectrum-spread signal using a digital modulation scheme, such as the QPSK scheme. Then, the transmitting circuit 5 combines the transmission signal produced by the digital modulation with a local oscillation signal generated at the frequency synthesizer 4, thereby frequency-converting the transmission signal into a radio signal. Then, the transmitting circuit 5 high-frequency-amplifies the radio signal to the transmission power level specified by the CPU 12. The amplified radio signal is supplied via the duplexer 2 to the antenna 1. Then, the antenna 1 transmits the radio signal toward the base station presently being connected to.

The input key (KEY) 14 is provided with not only dial keys but also function keys, including a send key, an end key, a power key, a volume control key, software keys, and a mode specify key. The display 15 is provided with an LCD and an LED. On the LCD, transmission and reception video data and mail text data are displayed. In addition, a phone book, the telephone number of the terminal the other party is using, a history of transmission and reception, the operating state of the present terminal, and other information are also displayed. An LED is used for notifying an incoming call or displaying the charged state of a battery 16. Numeral 17 indicates a power supply circuit. The power supply circuit 17 generates a specific operating power supply voltage Vcc from the output of the battery 16 and supplies the voltage to each circuit section.

The memory 13 is provided with not only a data storage area for recording and reproducing sound but also a received message storage area 13a and a phone book storage area 13b. The received message storage area 13a is used for storing received short messages addressed to the terminal of the embodiment (called present terminal hereinafter).

The phone book storage area 13b is used for storing the identification information for terminals to or from which the present terminal is expected to transmit or receive data. The identification information includes name, mail address, and callback phone number of the other party. In addition to these information elements, a melody pattern, an animation pattern, a vibration pattern, and an LED light-emitting pattern, which serve as information for specifying an incoming call notice mode, may be registered.

The control section 12, which uses a microprocessor as a main control section, has the following new control sections: a registration menu recognizing section 12a, a sender identification information registration control section 12b, and a correction control section 12c.

The registration menu recognizing section 12a displays a simultaneous registration mode for registering a sender's mail address (or source address) and a callback phone number of the sender of the sender simultaneously, an address registration mode for registering only the source address, and an address number registration mode for registering only the callback phone number on the LCD in the form of a menu. When the user operates so as to select one mode from the menu displayed, the registration menu recognizing section 12a recognizes the selected registration mode.

The sender identification information registration control section 12b registers the source address and callback phone number included in the received short message simultaneously or separately in the phone book according to the registration mode recognized by the registration menu recognizing section 12a. After the registering process has been completed, the registration control section 12b senses unregistered ones of the plurality of information elements constituting the identification information for the sender in the phone book. Then, the section 12b displays a message to prompt the user to input the sensed information elements on the LCD unit.

When the sender identification information registration control section 12b registers the source address and callback phone number simultaneously or separately, the correction control section 12c determines whether the corresponding information elements have already been registered in the phone book. When they have already been registered, the correction control section 12c reads the registered information elements and displays them on the LCD, thereby prompting the user to correct the registered information.

Figure 3:
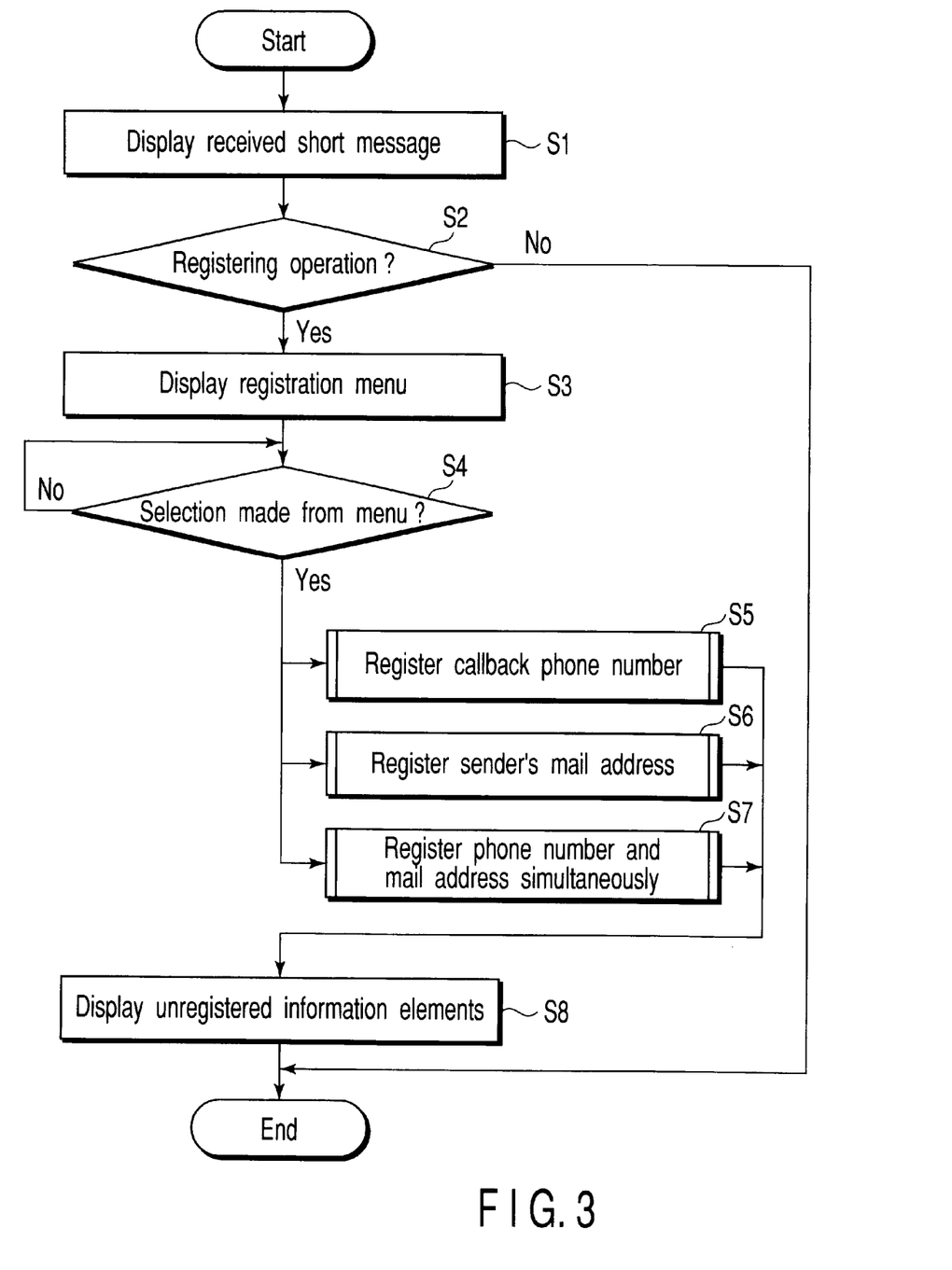
FIG. 3 is a flowchart to explain the procedure for sender identification information registration control by the mobile phone terminal of FIG. 1.
Figure 4:
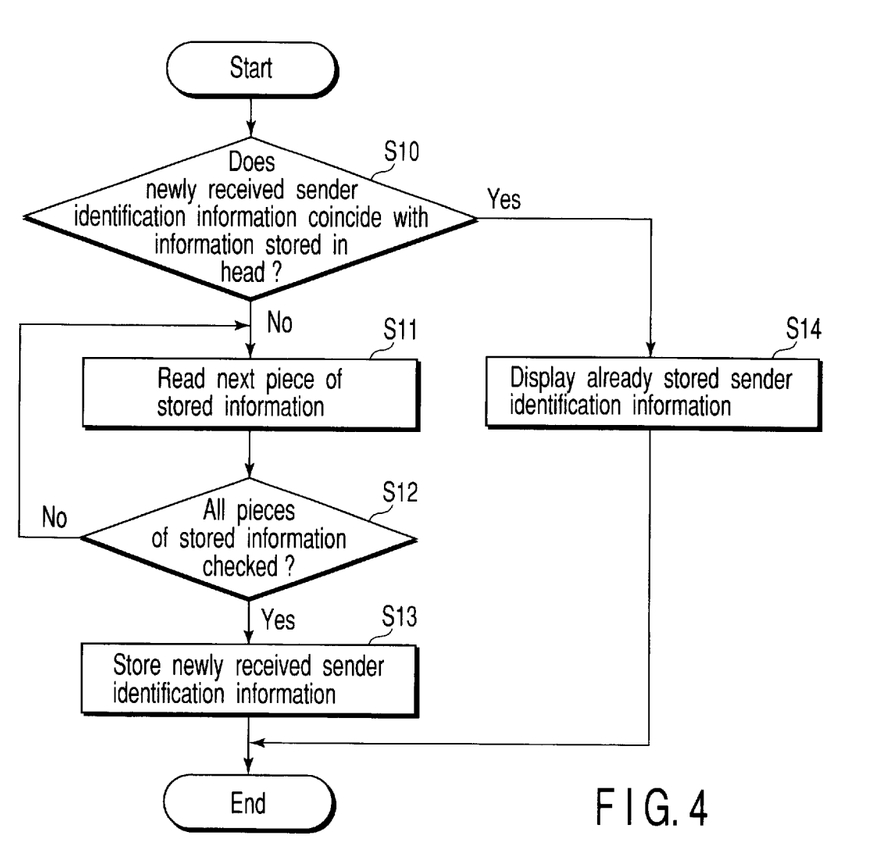
FIG. 4 is a flowchart to explain the procedure for the amendment of the registered information in sender identification information registration control shown in FIG. 3.

Next, the processing operation of the mobile phone terminal in registering the sender identification information in the phone book storage area 13b will be explained. FIGS. 3 and 4 are flowcharts to help explain the control procedure.

Figure 2:
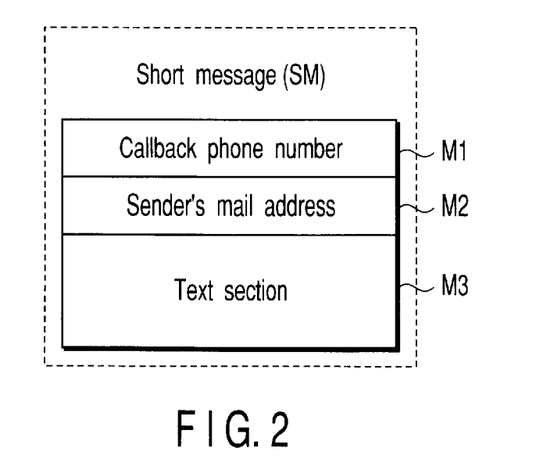
FIG. 2 shows the arrangement of information elements included in a short message.

It is assumed that, in the standby state, the short message addressed to the present terminal has arrived from a mail server (not shown). Then, the terminal receives the short message and stores the received short message into the message storage area 13a of the memory 13. FIG. 2 shows an example of the structure of the received short message including the callback phone number M1, the source address M2, and a mail body M3. In the mail body M3, text data has been written.

Figure 5:
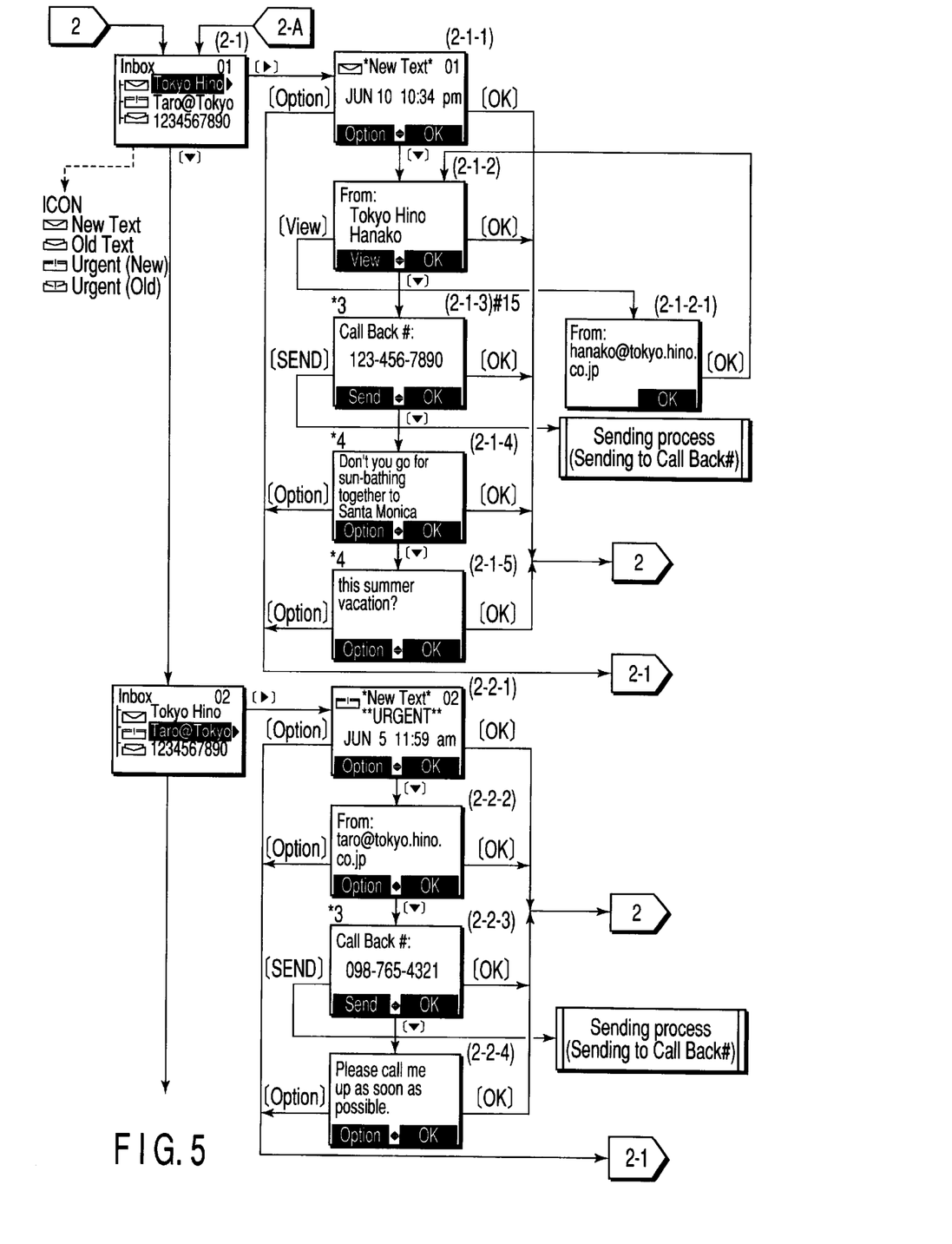
FIG. 5 shows a concrete example of the result of display by sender identification information registration control shown in FIG. 3.

After storing the received short message, the control section 12 of the mobile phone terminal executes the display control of the received short message in step S1. As a result, on the LCD of the display 15, each information element for identifying the sender included in the received short message is displayed as shown by, for example, (2-1) in FIG. 5.

Suppose the user of the present terminal selects one of the displayed information elements in this state, causes the information element to appear on the LCD, and selects "Option", one of the software keys displayed on the LCD. Then, the control section 12 causes an option menu to appear on the LCD as shown by (2-3) in FIG. 6. It is assumed that, in this state, the user selects the software key "Save Address" as shown by (2-6) in FIG. 6 in order to register the sender identification information in the phone book, using the received short message. Then, the control section 12 passes control from step S2 to step S3, where it performs the display control of the phone registration menu. As a result, on the LCD, the phone registration menu is displayed as shown by (2-6-1) in FIG. 6.

After the phone book registration menu has been displayed, the user selects the desired registration mode from the menu. For example, when wanting to register the source address and callback phone number simultaneously, the user select the software key "Both" as shown by (2-6-3) in FIG. 6. Then, the control section 12 passes control from step S4 to step S7, where it stores the source address and callback phone number included in the received short message simultaneously in the phone book storage area 13b.

Figure 6:
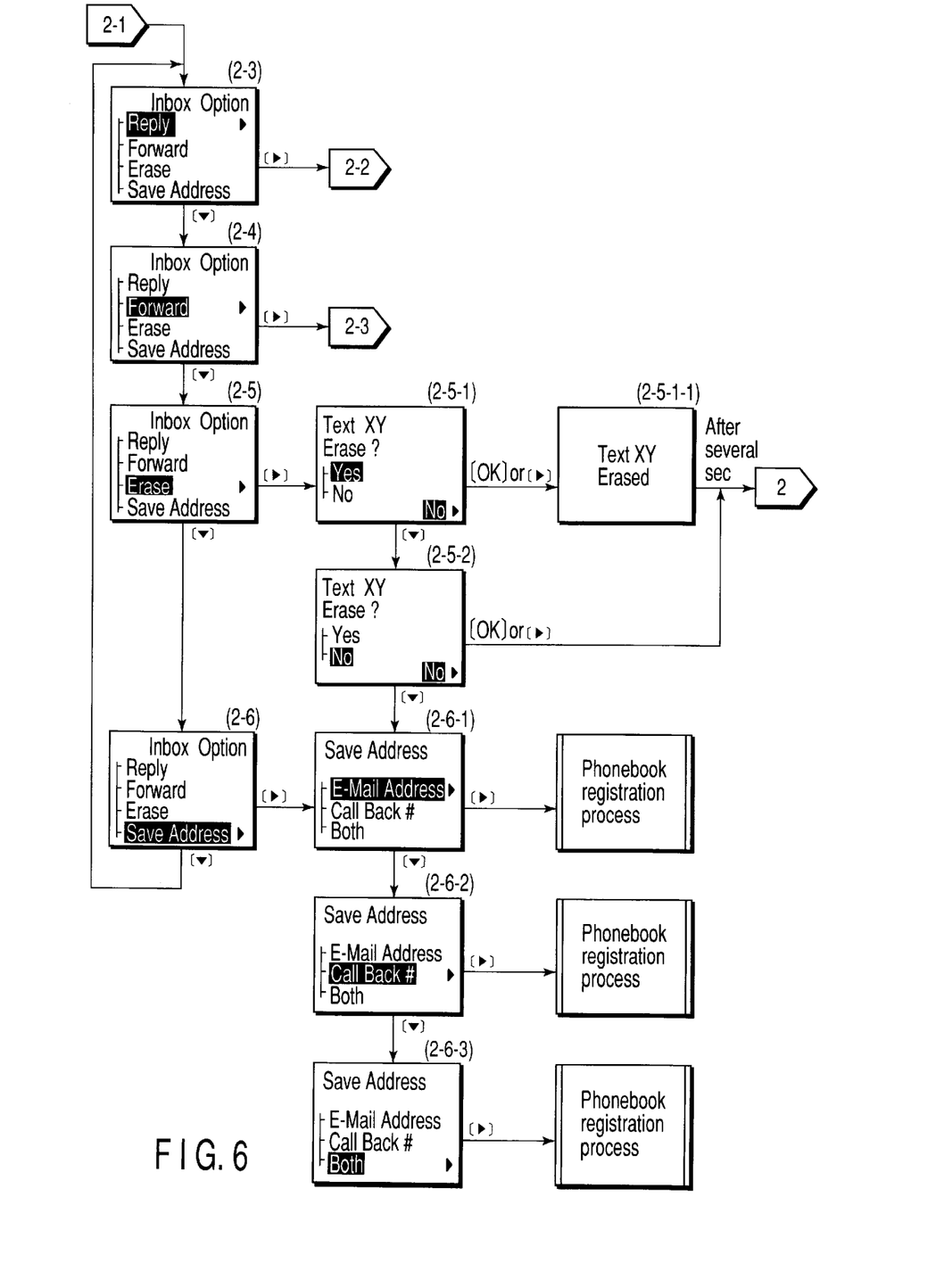
FIG. 6 shows a concrete example of the result of display by sender identification information registration control shown in FIG. 3.

Furthermore, when wanting to register either the source address or callback phone number, the user selects the software key "E-mail Address" or "Call Back #" as shown by (2-6-1) or (2-6-2) in FIG. 6. Then, the control section 12 passes control from step S4 to S6, where it stores the callback phone number or the source address included in the received short message simultaneously in the phone book storage area 13b.

In this way, according to the registration mode selected by the user, the callback phone number and source address included in the received short message are stored simultaneously or separately in the phone book storage area 13b.

Before the registering process, the control section 12 determines whether the same information as the received short message has already been stored in the phone book storage area 13b in step S10 to step S12 of FIG. 4. If the same information as the received short message has already been stored, the control section 12 displays the already stored information on the LCD in step S14, thereby prompting the user to correct the information. On the other hand, if the information in the received short message has not been registered, the control section 12 newly stores the callback phone number and sender's mail address included in the received short message in the phone book storage area 13b.

Then, suppose the process of registering a piece of the sender's identification information in the phone book storage area 13b has been completed. Then, the control section 12 passes control to step S8, where it determines whether any one of the plurality of information elements essentially constituting the registered sender's has not been registered. Then, if there is any unregistered information element, the control section 12 displays this information element on the LCD, thereby prompting the user to enter the information element.

For example, suppose the user has selected the software key "Call Back #" in the step of making a selection on the phone book registration menu. In this case, only the callback phone number included in the received short message is registered in the phone book storage area 13b. Thus, the control section 12 displays on the LCD the message representing that the name of the sender and the source address of the sender are unregistered. If determining from the displayed message that registration is necessary, the user enters the name of the sender and the source address of the sender by operating the keys in the input section 14.

That is, when there are unregistered elements in the plurality of information elements constituting the sender identification information, a message to indicate that there are unregistered elements is displayed. According to the message, the user inputs the data manually, thereby carrying out a supplementary registering process. Therefore, the sender identification information containing all the information elements can be registered in the phone book storage area 13b.

As described above, with this embodiment, when the user wants to register the sender identification information in the phone book storage area 13b using the received short message, the registration menu recognizing function 12a displays in the form of a menu the simultaneous registration mode for registering the sender's mail address and callback phone number simultaneously and the separate registration mode for registering the sender's mail address or callback phone number separately on the LCD. Then, when the user has selected any one from the displayed menu, the sender identification information registration control function 12b registers the sender's mail address and callback phone number included in the received short message simultaneously or separately in the phone book storage area 13b.

Therefore, with this embodiment, selecting the simultaneous registration mode "Both" makes it possible to register the source and callback phone number included in the received short message simultaneously in the phone book storage area 13b by one registering operation. As a result, the user need not repeat the registering operation for each information element, making registrations that much more easily in that much a shorter time, which improves the operability. Moreover, selecting the separate registration mode according to needs enables the sender's address and callback phone number in the received short message to be registered separately.

Furthermore, in carrying out the registering process, it is determined whether the same information element as that to be registered has already been stored in the phone book storage area 13b. If the same information element has already been stored, the registered information element is displayed, thereby prompting the user to correct the information manually. This prevents the same information elements from being registered redundantly, which enables the latest sender identification information to be constantly registered in the phone book storage area 13b.

Furthermore, after the registering process has been carried out, it is determined whether there is any unregistered information element in the plurality of information elements essentially constituting the registered sender identification information. If there is any unregistered information element, this unregistered information element is displayed on the LCD, thereby prompting the user to input the information element manually. This enables the user of the present terminal to register the unregistered information element additionally by a manual input operation. As a result, it is possible to register the finished sender identification information without the omission of any information element in the phone book storage area 13b.

The present invention is not limited to the above embodiment. For example, in the embodiment, the explanation has been given using a case where the sender identification information is composed of the name of the other party, the source address, and the callback phone number. The sender identification information may further include attribute information about the sender, such as a nickname, an address, or an occupation. Moreover, it may further include a second mail address, a phone number for urgent contact, and other information. In addition, the user may be allowed to set arbitrarily the number of or combination of information elements registered simultaneously in the phone book storage area 13b.

In the embodiment, the callback phone number and source address have been extracted from the header of the received short message and then stored in the phone book storage area. However, when the callback address number and source address are included in the mail body, the callback phone number and source address may be extracted from the mail body and stored in the phone book storage area. Moreover, when the callback phone number and source address are inserted in the header and the mail body includes the sender's attribute information, such as the nickname, address, and occupation of the sender, the callback phone number and source address may be extracted form the header and the sender's attribute information may be extracted from the mail body. Then, these extracted pieces of the information may be stored in the phone book storage area.

Furthermore, when the extracted information elements are stored in the phone book storage area, they may be edited according to the storage format in the phone book storage area. This enables the information elements in the sender identification information to be stored in a unified format.

In addition, when there are many information elements constituting the sender identification information, information elements of a predetermined type or a predetermined number of information elements may be selected and the selected information elements may be stored in the phone book storage area. The type of the information elements to be selected or the number of them may be input and set arbitrarily by the user.

While in the embodiment, both the simultaneous registration mode and the separate registration mode have been selectable, only the simultaneous registration mode may be provided. Moreover, in the embodiment, explanation has been given using a case where the sender identification information is registered in the phone book storage area 13b using the received short message. The sender identification information may be registered in the phone book storage area 13b using e-mail transmitted via the Internet.

Furthermore, the information communication terminals are not limited to mobile phone terminals. For instance, they include other mobile communication terminals, including PDAs, notebook personal computers, and such car-mounted communication apparatuses as car navigation units. They also include personal computers connected to cable channels, television sets, video game units, and home appliances.

As for the configuration of the information communication terminal, the type of communication method, the procedure for and the contents of registration control of sender information, the procedure for and the contents of correction control of the registered information elements, and others, the present invention may be practiced or modified in still other ways without departing from the spirit or essential character thereof.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An information communication terminal comprising:

a phone book;

a mail receiver configured to receive electronic mail in which a source address and a callback phone number is inserted;

an extracting section configured to extract the source address and callback phone number from the electronic mail received by said mail receiver; and a registration control section configured to register the source address and callback phone number extracted by said extracting section in the phone book simultaneously in one operation by a user of the information communication terminal.

2. An information communication terminal comprising:

a phone book;

a mail receiver configured to receive electronic mail which includes a plurality of information elements corresponding to a sender of the electronic mail;

an extracting section configured to extract the plurality of information elements from the electronic mail received by said mail receiver;

a controller configured to enable a user of the information communication terminal to selectively designate one of a first registration mode in which the extracted information elements are individually registered in the phone book, and a second registration mode in which the extracted information elements are registered simultaneous in the phone book;

a first registration control section configured to register the plurality of information elements extracted by said extracting section in the phone book individually in a plurality of registering operations by the user according to the designation of the first registration mode; and a second registration control section configured to register the plurality of information elements extracted by said extracting section in said phone book simultaneously in one operation by the user of the information communication terminal according to the designation of the second registration mode.

* * * * *